UNITED STATES PATENT OFFICE.

JAMES E. RIELLY, OF NEWARK, NEW JERSEY.

SPRING-WHEEL.

No. 854,238.

Specification of Letters Patent.

Patented May 21, 1907.

Application filed December 3, 1906. Serial No. 346,021.

*To all whom it may concern:*

Be it known that I, JAMES E. RIELLY, a citizen of the United States, residing at Newark, in the county of Essex and State of New Jersey, have invented certain new and useful Improvements in Spring-Wheels; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to a spring wheel that embodies a rim portion surrounded by a space from the felly of the wheel, the space being occupied by a corrugated one piece spring, and the rim carrying a tire on its periphery.

The invention further provides for a spring, so arranged between the felly and the rim, that it will be adapted for the transmission of power from the felly to the rim, or vice versa. The spring is not secured to either one of the members, and is free to contract and expand throughout its full length.

The invention is illustrated in the accompanying drawings, in which

Figure 1:
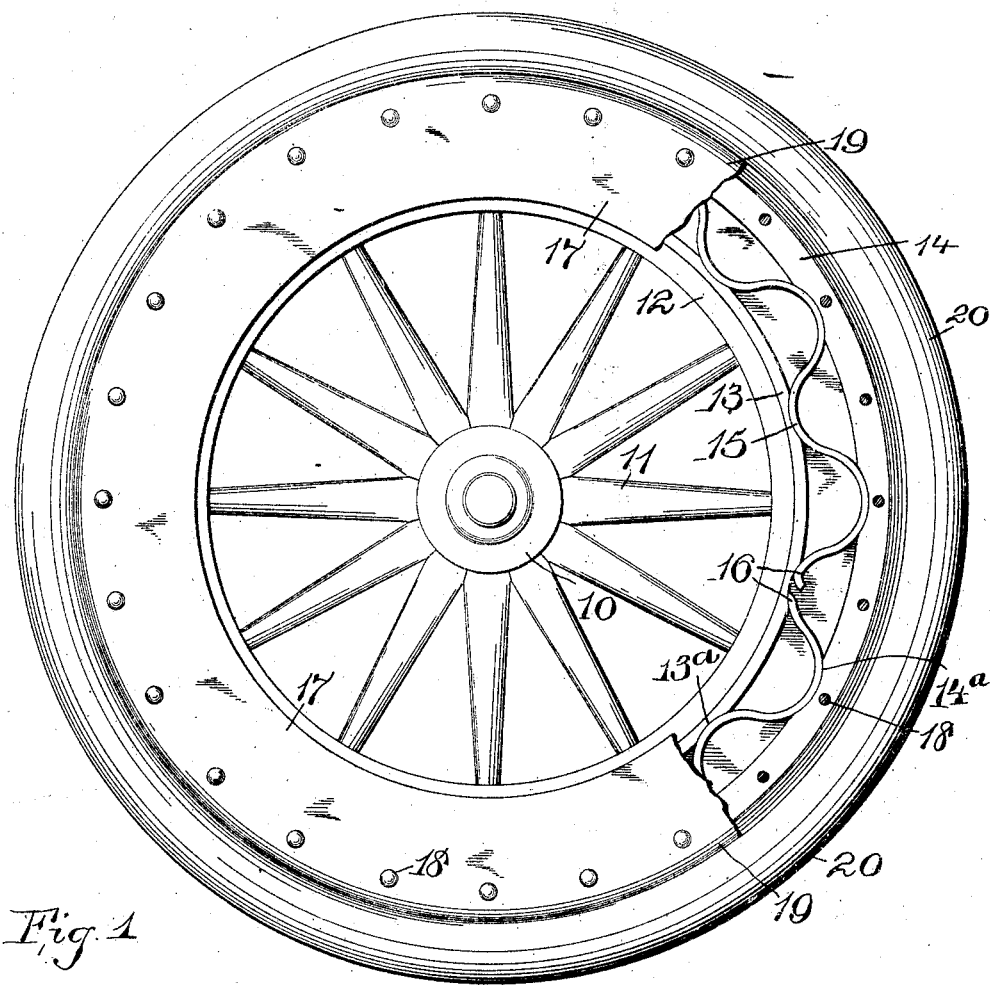
Figure 2:
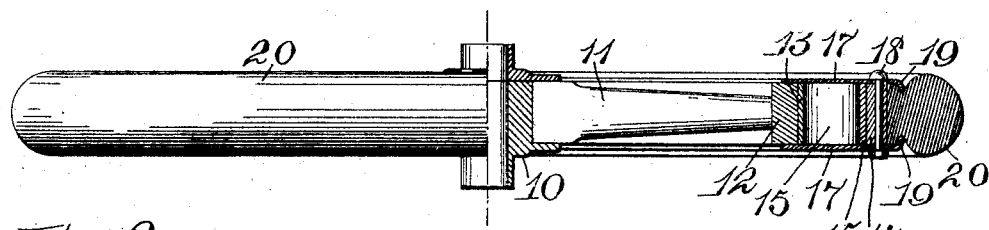

Figure 1 is an elevation of a wheel with one of the annular side plates cut away to show the spring, and Fig. 2 is a view half in elevation and half in section.

In the drawings is shown a hub portion 10 which can be of any construction, and is provided with the spokes 11, and on the end of the spokes is affixed a felly 12. This felly is preferably bound with a steel or similar band 13 arranged to take up the wear of a spring. Considerably larger than the felly and surrounding it, is a rim 14, and between the rim and the felly is arranged a spring 15 which is corrugated so as to bring its convolutions in contact with the felly and then with the rim, and so on around the wheel, and this spring is preferably made of one piece, and the two ends 16 are disengaged so as to allow the expansion and contraction of the spring due to the variations of load and speed. The spring 15 has its corrugations arranged alternately in the recess 13ª, and in the recess 14ª, these recesses being in the outer edge of the band 13 of the felly, and the inner edge of the rim portion 14, respectively. It will be seen from this arrangement, that when power is applied to the axle to drive the wheel, or the power applied to the hub, that the spring, by reason of its corrugations being in the recesses or depressions, will bind and act to transmit rotation of one member to cause rotation of the other. At the same time these recesses do not interfere in any way with the resiliency of the spring, and do not prevent an easy riding of the wheel.

A plate 17, on each side of the wheel, is secured to the rim by the bolts 18 and extends across the space in which the spring is placed, and partially over the felly to keep out dust and dirt, and at the same time to give the wheel the proper finish. Each plate 17 has an inturned portion 19 which grasps a tire 20 arranged around the rim, and thus serves to secure this tire.

This wheel is cheap, and the spring, if broken, can be easily replaced, and at the same time there is a distribution of wear. Attention is also called to the free ends 16 of the spring which can ride one over the other when the spring is very much compressed, and thus the chances of breaking the spring are minimized.

Having thus described my invention, what I claim is:—

A spring-wheel comprising a body-portion having a felly, a rim surrounding the felly at a distance therefrom to form a circumferential space, and an evenly corrugated flat spring in the space and engaging the felly and the rim, the felly and rim being provided with recesses of less than a semicircle to receive the corrugation of the spring.

In testimony, that I claim the foregoing, I have hereunto set my hand this twenty seventh day of November 1906.

JAMES E. RIELLY.

Witnesses:
GUSTAVUS A. RICHARDS,
E. A. PELL.